United States Patent [19]

Wang

[11] Patent Number: 4,935,818

[45] Date of Patent: Jun. 19, 1990

[54] COLOR MONITOR PHOTO CONTROL SYSTEM

[76] Inventor: Hong Y. Wang, No. 346-7, Changchun Rd., Taipei, Taiwan

[21] Appl. No.: 347,666

[22] Filed: May 5, 1989

[51] Int. Cl.$^5$ .............................................. H04N 9/79
[52] U.S. Cl. ................................... 358/244; 358/332; 358/909; 358/76
[58] Field of Search ...................... 358/76, 75, 80, 224, 358/906, 909, 903, 332, 255, 244.1

[56] References Cited

U.S. PATENT DOCUMENTS

| | | | |
|---|---|---|---|
| 4,208,676 | 6/1980 | Berioick et al. | 358/255 |
| 4,763,204 | 8/1988 | Kinoshita et al. | 358/909 |
| 4,827,332 | 5/1989 | Miyake et al. | 358/909 |

FOREIGN PATENT DOCUMENTS 57-611739 5/1982 Japan .

OTHER PUBLICATIONS

Oscilloscope cameras, p. 373, Teletronix catalog 1971.

Primary Examiner—Howard W. Britton
Assistant Examiner—Kim Yen Vu
Attorney, Agent, or Firm—Bacon & Thomas

[57] ABSTRACT

A color monitor photo control system having a controller and a rectangular cone-shaped shield to prevent outside light from shining on the screen. The shield has a photo-sensor provided adjacent to the camera to sense brightness of the screen, and a light-testing button provided adjacent to the photo-sensor. The camera has a switching line connected to the controller and mounted on the shutter of the camera to actuate the controller and mechanically open the shutter. The controller is electrically connected to a color monitor and a computer. The controller has a micro-processor, and a number of RGB visual signal switches. The micro-processor receives signals from the light-testing button, the two-step switching line and the photo-sensor to adjust the number of frames of the RGB visual signals to the color monitor during the opening of the shutter with the aid of the visual signal switches.

4 Claims, 4 Drawing Sheets

COLOR MONITOR PHOTO CONTROL SYSTEM

FIELD OF THE INVENTION

The present invention relates to a control system for a camera to take a picture from the screen of a color monitor which serves as a visual interface between the user and a computer, and in which the intensity of the electronic beams forming the picture on the screen are controlled by the computer. In particular, the present invention relates to a control system for a camera, which is associated with the shutter of the camera, and controls the RGB (red, green and blue) visual signals outputted from the computer to respectively control the intensity of the electron beams of the color monitor. More particularly, the present invention relates to a control system for a camera for compensating or, for controlling, the color deviation of the pictures taken from the screen without the aid of a glass filter.

BACKGROUND OF THE INVENTION

Conventionally, the user utilizes an ordinary or a sophisticated camera to directly take a picture from the screen of a color monitor. There is no electrical connection between the camera and the monitor, and the adjustment of the shutter and aperture of the camera is mechanically controlled. The user encounters the following problems when taking a picture from the screen of the color monitor.

(1) The pixels distributed on the screen are not simultaneously excited by the electronic beams. The picture is formed by the shining of the pixels in sequence. Therefore, it is almost impossible to synchronize the time of the opening of the mechanical shutter with the shining of the pixels of the frame, and it is also almost impossible to match the exposure time of the mechanical shutter with the scanning frame rate of the picture displayed on the screen. As a result, portions of the picture are not subject to the correct degree of exposure; for example, some portions of a picture thus taken by the conventional camera may be brighter and the other portions thereof may be darker than that originally displayed on the screen.

(2) In order to alleviate the above-mentioned drawnbacks, the user may increase the exposure time that the shutter is open for the film and diminish the aperture thereof to alleviate the above-mentioned drawback and get an improved picture. However, it is difficult to get a optimum degree of exposure by the micro-adjustment of the mechanical aperture and/or the mechanical shutter, since a sophisticated instrument is required to calculate the degree of exposure and control the exposure time in order to match with different degree of the brightness of the screens, which is determined depending on the preference of the user. For example, the optimum degree of exposure for the film about a standard brightness of a screen is attained on the condition that the aperture is adjusted at f/22 and the optimum exposure time of the shutter for the film is set at ½ second. When taking a picture from the screen of a color monitor, if the period for scanning the screen is 1/60 second per frame, it is obvious that the optimum exposure time should be 30(i.e., ½÷1/60) frames with the standard brightness. If the brightness of the screen is lower than the standard brightness of the screen and the aperture is similarly adjusted at f/22, it may take an exposure of 32 frames to effect the optimum degree of exposure. Therefore, if the user prefers a lower or higher brightness of the screen, he should adjust the shutter or the aperture at the rate of 32: 30 to get an optimum degree of exposure in comparison with the standard brightness. However, it is difficult to adjust to the optimum degree of exposure since the shutter and aperture are mechanically controlled.

(3) In conventional techniques, when taking a picture from the screen of a color monitor, at least one filter is further required to compensate the color deviation not only resulting from the color temperature deviation (i.e., the difference of the spectrum distribution between normal sun light and the light emitted from the screen of a color monitor), but also resulting from the unbalanced weighting of the RGB visual signals on the screen of a color monitor.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide a color monitor photo control system wherein the picture from the screen of a color monitor is controlled by a computer, in which the RGB (red, green and blue) visual signals outputted from the computer are adjustable by the control system to respectively control the intensity of the electronic beams of the color monitor.

Another objective of this invention is to provide a color monitor photo control system which simulates the function of a filter to compensate the color deviation of the films taken from the screen without using a glass filter.

Still another objective of this invention is to provide a color monitor photo control system which is electrically connected to the computer and the camera so as to adjust the exposure time for the film when using a camera to take a picture from the screen of a color monitor.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
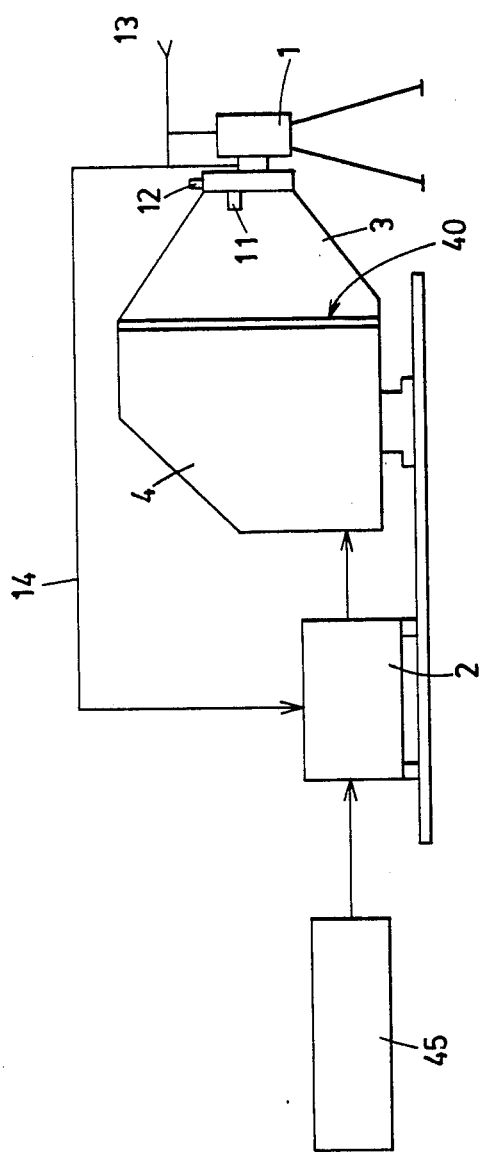
FIG. 1 is a schematic view of a color monitor photo control system in accordance with the present invention.

With reference to the drawings and in particular to FIG. 1 thereof, it can be seen that a color monitor photo control system in accordance with the present invention comprises a controller 2 and a cone-shaped shield 3 which prevents outside light from shining on the screen 40 of the color monitor 4. The shield 3 is interposed between the camera 1 and the color monitor 4 and substantially has a photo-sensor 11 provided thereon adjacent to the front surface of the camera 1 to sense the brightness of the screen 40, and a light-testing testing button 12 provided ajacent to the photo-sensor 11.

The controller 2 is interposed between a computer 45 and the monitor 4, and is further connected to a two-step switching line 133 of the camera 1 by a cable 14. The two-step switching line 13 is mounted on the shutter of the camera 1 to actuate the shutter and the controller 2 via the cable 14. When the two-step switching line 13 is pulled down the first time (i.e., to the first step), it generates a first actuating signal (a1) to inform the controller 2 to receive the vertical synchronizing signal outputted from the computer 45, while the mechanical shutter of the camera remains closed. When the line 13 is pulled down the second line (i.e., to the second step), it generates a second actuating signal (a2) to inform the controller 2 to synchronize the period of the RGB visual signals from the computer, and the shutter is simultaneously opened.

As can be seen in FIG. 1, the controller 2 adjusts the outputs (i.e, the RGB visual signals) of the computer to the monitor 4, and further determines the length of the shining time of the RGB visual signals on the screen 40, under the control of the signals (a1 and a2) transmitted from the two-step switching line 13. As a result, the degree of exposure is controllable by the controller 2 when using a camera to take a picture from the screen 40.

Figure 2:
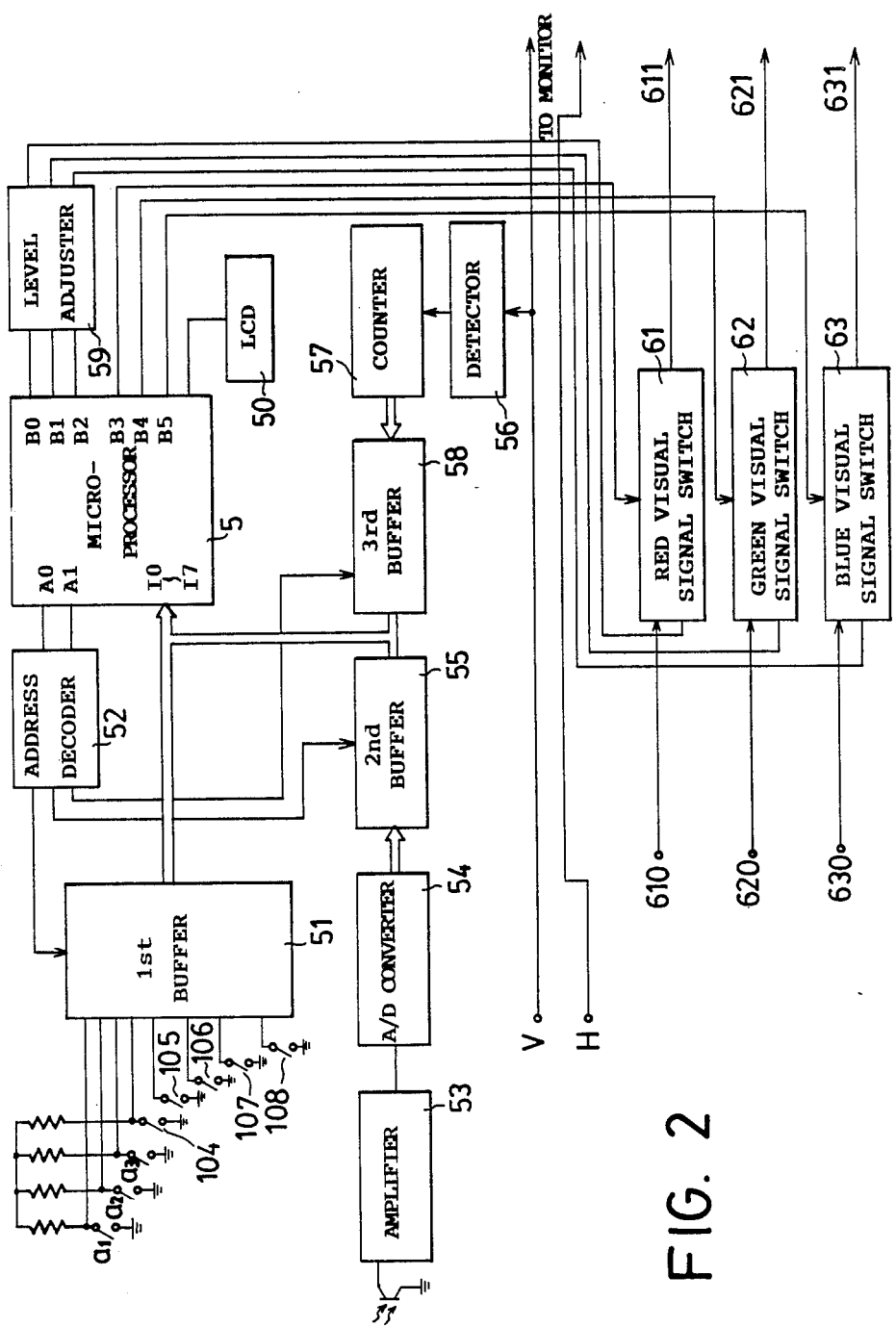
FIG. 2 is a circuit diagram of the control system of FIG. 1.

Particularly referring to FIG. 2, the circuitry of the controller 2 will be discussed. Signals (a1, a2 and a3) are sent to the inputs of a micro-processor 5 via a first buffer 51 which receives address signals decoded by an address decoder 52 from the micro-processor 5. Signals (a1 and a2) are produced by pulling the two-step switching line 13 to inform the micro-processor 5 that a picture is going to be taken. Brightness signal (a3) is produced by pressing the light-testing button 12 to actuate the photo-sensor 11 to detect the brightness of the screen 40. It should be noted that, in another perferred embodiment, the photo-sensor 11 can be automatically actuated to detect the brightness of the screen 40 when the controller 2 is actuated or power-on initilizing, without pressing the light-testing button 12. Furthermore, a plurality of switches 104 to 108 are connected to the first buffer 51 to preset the mode selection for the camera. For example, switches 104 to 108 can provide different selections for user, as follows:

(1) various degrees of compensation when color deviation is apparent;

(2) different types of films; for example, different "ASA" value and so on.

Moreover, a LCD (liquid crystal display) 50 is connected to an output of the micro-processor 5 to display the modes selected by the user.

After detecting the brightness of the screen 40, the photo-sensor 11 sends the results to the micro-processor 5, which processes the results via an amplifier 53 and an A/D (analog to digital) converter 54 and enters the results into a second buffer 55, which receives address signals decoded by the address decoder 52 from the micro-processor 5.

In addition to the RGB visual signals, the computer further sends vertical (V) and horizontal (H) synchronizing signals directly to the color monitor 4. When the two-step switching line 13 is pulled down the first time, the vertical synchronizing signals (V) are received by a detector 56 and a counter 57, and entered into a third buffer 58, which receives the address signals decoded by the address decoder 52 from the micro-processor 5.

After receiving the input signals from the first, second and third buffers 51, 55 and 58, the micro-processor 5 sends output signals to determines the number of frames of the RGB visual signals. Red, green and blue visual signal switches 61, 62 and 63, for respectively controlling the red, green and blue visual signals are connected to the outputs of the micro-processor 5. It should be appreciated that the number of the visual signal switches is not limited to three, since in some protocol of the computer to the color monitor interface, there are six lines for RGB visual signal representation. Moreover, with respect to the third buffer 58, the detector 56 directly receives the green visual signal, when the vertical synchronizing signals (V) are superimposed on the green visual signal as a composite synchronizing signal in other protocols.

The outputs B3 to B5 of the micro-processor 5 and the original RGB visual signals 610, 620 and 630 are connected to the respective inputs of the visual signal switches 61, 62 and 63, the outputs 611, 621 and 631 of which are electrically connected to the color monitor 4. The outputs B0 to B2 of the micro-processor 5 are adjusted by a level adjuster 59 and then connected to respective control inputs of the visual signal switches 61, 62 and 63 to communicate one of the inputs with the outputs 611, 621 and 631 thereof. When the output B0, B1, or B2 is communicated with the output 611, 621 or 631, the visual signal switches 61, 62 or 63 is in Off mode; otherwise, the switches 61, 62 or 63 is in On mode. It should be noted that when in On mode, the picture shown on the screen 40 is not processed by the controller 2. When in Off mode, the picture shown on the screen 40 is processed by the controller 2; for example, the level adjuster 59 sets automatically the outputs B0 to B2 to the lowest signal level and darken the screen 40.

Figure 3:
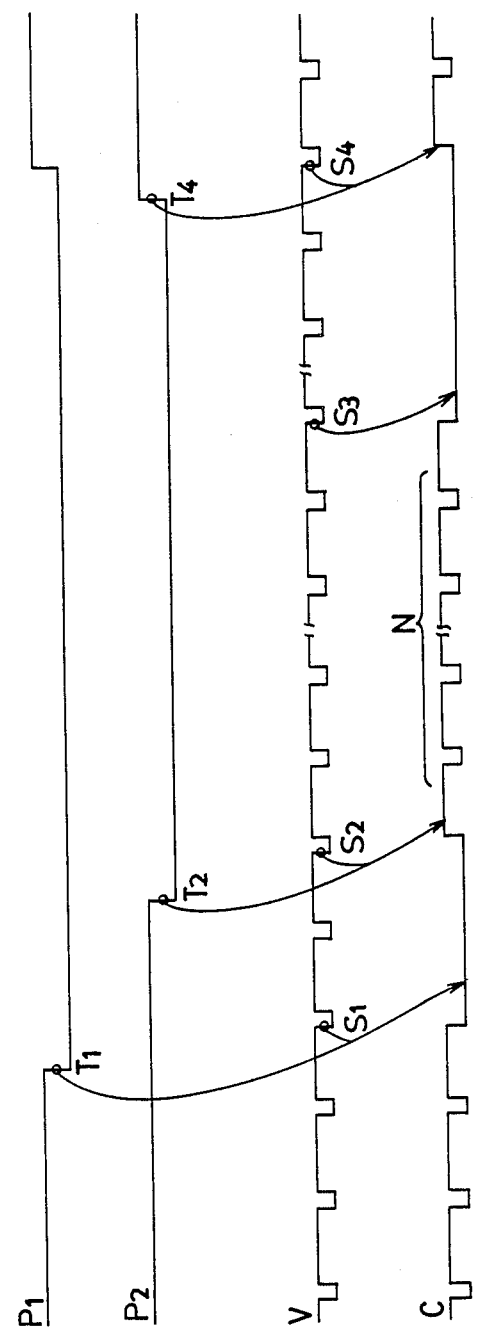
FIG. 3 is a series of phase diagrams showing the micro-adjustment of the exposure time by pulling down the two-step switching line.

Turning now to FIG. 3, a series of phase diagrams with respect to the micro-adjustment of the optimum exposure time can be seen. The micro-adjustment is effected by pulling down to the two-step switching line 13. In FIG. 3, P1 is a phase diagram of the first actuating signal (a1) transmitted to the controller 2; P2 is a phase diagram of the second actuating signal (a2) transmitted to the controller 2; V is a phase diagram of the vertical synchronizing signals; and C is a phase diagram of the RGB visual signals. It should be noted that the RGB visual signals are synchronized with the vertical synchronizing signals.

Before the two-step switching line 13 is pulled down, the visual signal switches 61, 62 and 63 are in On mode; that is, the visual signals forming the picture displayed on the screen 40 are directly transmitted from the computer. After the user pulls down the two-step switching line 13 at first time T1, the micro-processor 5 detects and receives the first vertical synchronizing signal S1 from the computer 45, and then sets all the RGB visual signal switches 61, 62 and 63 in Off mode so that all the outputs B0 to B2 of the level adjuster 59 are set to the lowest signal level. Comprehensively, no picture is displayed on the screen 40 and the screen 40 is dark since the processed RGB visual signals 611, 621 and 631 connected to the color monitor are communicated with the outputs B3 to B5 which are all set the lowest (darkest) level.

After the two-step switching lines 13 is pulled down at second time T2 and the shutter is mechanically opened, the micro-processor 5 detects and receives the second vertical synchronizing signal S2 from the computer, and then sets all the RGB visual signal switches 61, 62 and 63 in On mode. For the optimum exposure of the film, the micro-processor 5 determines the exposure time (i.e., the duration of the desired number of frames) by calculating the brightness of the screen 40. For example, in FIG. 3, N number of frames is required to get the optimum exposure and the first frame is synschronized with the second vertical synchronizing signal S2.

After the desired number of frames is released (i.e., the desired exposure), the micro-controller 5 detects the third vertical synchronizing signal S3 to set the RGB visual signal switches 61, 62 and 63 in Off mode, and the screen is dark again. After the shutter is mechanically closed at time T4 by releasing the two step switching line 13, the micro-processor 5 then detects the fourth vertical synchronizing signal S4 from the computer and sets all the RGB visual signal switches 61, 62 and 63 in On mode. At this time, the picture displayed on the screen 40 is similar to that before the picture is taken, wherein the RGB visual signals 611, 621 and 631 forming the picture are the original RGB visual signals 610, 620 and 630 transmitted from the computer.

It is appreciated that the mode for the shutter should be set to an appropriate mode, before the two-step switching line 13 is pulled down, since the duration between time T2 and T4 has to be sufficient for shining the desired number of frames. For instance, the opening and closing of the shutter can be controlled manually by setting the shutter of camera at "B" mode by pulling down the two-step switching line 13, or the duration for opening the shutter can be pre-determined as 1 or 2 seconds, long enough for desired exposure.

As mentioned before, the optimum degree of exposure for a specific film under the standard brightness of the screen is attained on the condition that the aperture is adjuster at f/22 and the exposure time of the shutter is set at ½ second. If the period for scanning the screen is 1/60 second per frame, the optimum exposure is 30 frames for the standard screen brightness. It is appreciated that for the screen with standard brightness, the micro-processor 5 sets the RGB visual signal switches 61, 62 and 63 in On mode at the occurrence of the second vertical synchronizing signal S2, and sets the RGB visual signal switches 61, 62 and 63 in off mode at the occurrence of the third vertical synchronizing signal S3, when the optimum degree of exposure is 30 frames. If the brightness of the screen is lower/higher than the standard brightness of the screen, the micro-processor 5 determines the optimum exposure according to the brightness of the screen, which is detected by the photo-sensor 11, and takes the required number of frames within the duration between the occurrence of the vertical synchronizing signals S2 and S3.

It should be noted that the degree of exposure of the respective red, green and blue visual signals are adjustable in accordance with the present invention to compensate the color deviation not only resulting from the difference of the spectrum distribution between normal sun light and the light emitted from the screen of a color monitor, but also resulting from the unbalanced weighting of the RGB visual signals on the screen of the color monitor. With respect to the embodiment described in FIG. 3, in which the compensation for the color deviation is not considered, the number of frames of the red, green and blue visual signals for the optimum exposure are as follows:

Tr:Tg:Tb=30: 30: 30

Comprehensively, the compensation for the color deviation is required based on the data received from the second buffer 55, since the data showing the brightness of the screen 40 is obtained from the photo-sensor 11 to the second buffer 55. The micro-processor 5 calculates the optimum exposure time respectively for the red, green and blue visual signals within tolerable limits (i.e., between 20 to 40 frames) to auto-preset the desired number of frames for the optimum exposure time, since the number of frames of the red, green and blue visual signals are respectively controlled by the respectively visual signal switches 61, 62 and 63. It should be noted that according to this invention, the user has more flexibility of choice, since 20+20+20=8000 different kinds of chromatic adjustment are provided. Each chromatic adjustment is equivalent to the effect of a real glass filter. The optimum exposure to compensate the color deviation is calculated by detecting the light intensity of the visual signal from the screen 40, and comparing the detected light intensity with the standard light intensity. The formula is as follows:

Topt=(Ista/Idet)×Tsta

Topt for red=(Ista for red/Idet for red)×Tsta

Topt for green=(Ista for green/Idet for green) ×Tsta

Topt for blue=(Ista for blue/Idet for blue)×Tsta wherein
Tsta is the optimum exposure time for the standard brightness of the screen;
Topt (for red, green or blue) is a calculated optimum exposure time (for red, green or blue visual signal);
Ista is the light intensity detected from the standard brightness of a screen, which is obtained with respect to a fixed picture; and
Idet (for red, green or blue) is the light intensity detected by the photo-sensor 11 and processed by the A/D converters 54 from the fixed picture in a single color. Namely, when the user presses the light testing button 12, the micro-processor 5 respectively issues an all-bright, all-red, all-green or all-blue picture to obtain Idet for bright, Idet for red, Idet for green, or Idet for blue. For instance, an all-red picture can be obtained by setting all of the visual signal switches 61, 62 and 63 in Off mode, and the output B0 of the level adjuster 59, which is connected to the control input of the red visual signal switches 61, being set to the highest level under the fixed picture, and other outputs B1 and B2 of the level adjuster 59 being simutaneously set to the lowest level. The level adjuster 59 is respectively connected to the control inputs of the green and blue visual signal switches 62 and 63, which is set to the lowest level under the fixed picture.

Figure 4:
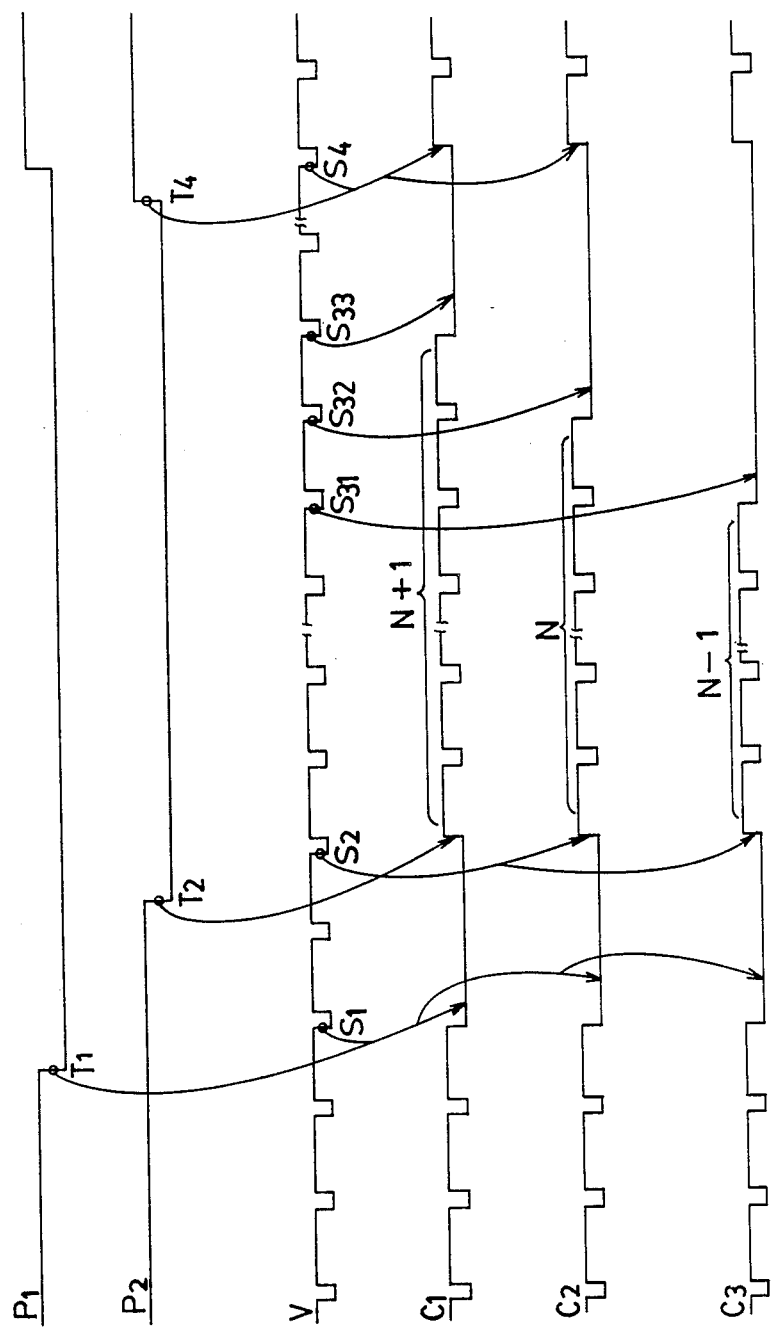
FIG. 4 shows a series of phase diagrams, illustrating the different exposure time for the film with respect to the respective red, green and blue visual signals in order to compensate for the color deviation therein.

Referring particularly to FIG. 4, the phase diagrams of FIG. 4 are similar to those of FIG. 3, but the exposure time of the red, green and blue visual signals 611, 621 and 631 are different to compensate for the color deviation in this embodiment, the ratio of which are as follows:

Tr:Tg:Tb=N+1:N:N−1, where N is an integer value.

In FIG. 4, C1 is a phase diagram of the red visual signals outputted from the red visual signal switch 61; C2 is a phase diagram of the green visual signals outputted from the green visual signal switch 62; and C3 is a phase diagram of the blue visual signals outputted from the blue visual signal switch 63.

As mentioned heretofore, after the two-step switching lines 13 was pulled down at second time T2, the micro-processor 5 detects and receives the second vertical synchronizing signal S2, and then sets all the RGB visual signal switches 61, 62 and 63 in On mode. The micro-processor 5 determines the number of frames for the red, green and blue visual signals based on the Tdet for red, green and blue. For example, there are N +1 frames for the red visual signal, N frames for the green visual signal and N−1 frames for the blue visual signal.

The micro-controller 5 respectively detects thirty-one, thirty-two and thirty-three vertical synchronizing signals S31 to respectively set the RGB visual signal switches 61, 62 and 63 in Off mode after the desired numbers of frames are released. Thus, the screen 40 is dark again. After the shutter is mechanically closed at time T4 by releasing the two step switching line 13, the micro-processor 5 then detects the fourth vertical synchronizing signal S4 and sets all the RGB visual signal switches 61, 62 and 63 in On mode. Therefore, the exposure time and chromatic sensation are micro-adjustable to compensate for the color deviation for the camera to take a picture from the screen 40 of the color monitor 4 without the aid of glass filters.

As various possible embodiments might be made of the above invention without departing from the scope of the invention, it is to be understood that all matter herein described or shown in the accompanying drawings is to be interpreted as illustrative and not in a limiting sense. Thus it will be appreciated that the drawings are exemplary of a preferred embodiment of the invention.

I claim:

1. A color monitor photo control system comprising a controller connected to a switching line provided on a camera via a cable, and a cone-shaped shield;
said switching line being mounted on a shutter of said camera to mechanically open said shutter of said camera, and actuating said controller;
said shield preventing outside light from shining on said screen; said shield having a photo-sensor provided thereon adjacent to said camera to sense brightness of said screen;
said controller being electrically connected to a color monitor and a computer which sends red, green and blue visual signals, vertical and horizontal synchronizing signals to said color monitor;
said controller comprising first, second and third buffers, a micro-processor, and a plurality of red, green and blue visual signal switches;
actuating signals produced by pulling down said switching line, said actuating signals being entered into said first buffer;
brightness signals of said screen being produced by said photo-sensor and being entered into said second buffer;
vertical synchronizing signals received by a detector from said computer being entered into said third buffer; and
outputs of said micro-processor connected to said red, green and blue visual signal switches to adjust said number of frames of said red, green, and blue visual signals during said opening of said shutter.

2. A color monitor photo control system as set fourth in claim 1, wherein a plurality of said outputs of said micro-processor are connected to inputs of a level adjuster; outputs of said level adjuster being connected to respective control inputs of said visual signal switches to control intensity of frames of said red, green and blue visual signals on said screen.

3. A color monitor photo control system as set fourth in claim 1, wherein a plurality of switches are connected to said inputs of said first buffer to pre-set photo modes, and a liquid crystal display is electrically connected to said output of said micro-processor to display said selected modes.

4. A color monitor photo control system as set fourth in claim 1, wherein a light-testing button is provided adjacent to said photo-sensor to actuate said photo-sensor to detect said brightness of said screen when pushing down said light-testing button.

* * * * *